(12) United States Patent  
Arazaki (10) Patent No.: US 9,041,975 B2  
(45) Date of Patent: May 26, 2015

(54) PRINTING DEVICE FOR EXECUTING TWO-SIDED PRINTING, AND CONTROL METHOD AND NON-TRANSITORY COMPUTER-READABLE MEDIUM FOR PRINTING DEVICE THAT EXECUTES TWO-SIDED PRINTING

(75) Inventor: Shinichi Arazaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 803 days.

(21) Appl. No.: 13/013,969

(22) Filed: Jan. 26, 2011

(65) Prior Publication Data

US 2011/0199622 A1   Aug. 18, 2011

(30) Foreign Application Priority Data

Feb. 16, 2010   (JP) ................. 2010-030990

(51) Int. Cl.
```
G06F 3/12      (2006.01)
G06K 15/12     (2006.01)
G06K 15/02     (2006.01)
```
(52) U.S. Cl.
CPC .............. *G06F 3/1285* (2013.01); *G06F 3/122* (2013.01); *G06F 3/1244* (2013.01); *G06F 3/125* (2013.01); *G06K 15/128* (2013.01); *G06K 15/1889* (2013.01)

(58) Field of Classification Search
None
See application file for complete search history.

(56) References Cited

U.S. PATENT DOCUMENTS

2009/0129806 A1   5/2009   Sunada et al.
2009/0237687 A1*  9/2009   Takata .................. 358/1.9

FOREIGN PATENT DOCUMENTS

| JP | 63-293063 A  | 11/1988 |
| JP | 07-306550 A  | 11/1995 |
| JP | 2001-246809 A | 9/2001  |
| JP | 2004-255675 A | 9/2004  |
| JP | 2009-128376 A | 6/2009  |
| JP | 2009-226706 A | 10/2009 |

OTHER PUBLICATIONS

Machine translation of Japanese Publ. H09248942 to Shima et al.*
Machine translation of Japanese Pub. 2004-255675 to Hasegawa.*

* cited by examiner

*Primary Examiner* — Paul F Payer
(74) *Attorney, Agent, or Firm* — Global IP Counselors, LLP (57) ABSTRACT

A printer device has a two-sided printing function and a circulatory transporting path for transporting a printing medium. The printer device is configured such that after creating a set of print data for a first recording surface to be printed with two-sided printing, the printer device adds a set of dummy print data for a second recording surface corresponding to a back side of the first recording surface to the set of print data for the first recording surface.

7 Claims, 6 Drawing Sheets

PRINTING DEVICE FOR EXECUTING TWO-SIDED PRINTING, AND CONTROL METHOD AND NON-TRANSITORY COMPUTER-READABLE MEDIUM FOR PRINTING DEVICE THAT EXECUTES TWO-SIDED PRINTING

CROSS-REFERENCE TO RELATED APPLICATIONS

This application claims priority to Japanese Patent Application No. 2010-030990 filed on Feb. 16, 2010. The entire disclosure of Japanese Patent Application No. 2010-030990 is hereby incorporated herein by reference.

BACKGROUND

1. Technical Field

The present invention relates to a printing device. More particularly, the invention relates to creating print data used during two-sided printing.

2. Related Art

Figure 6:
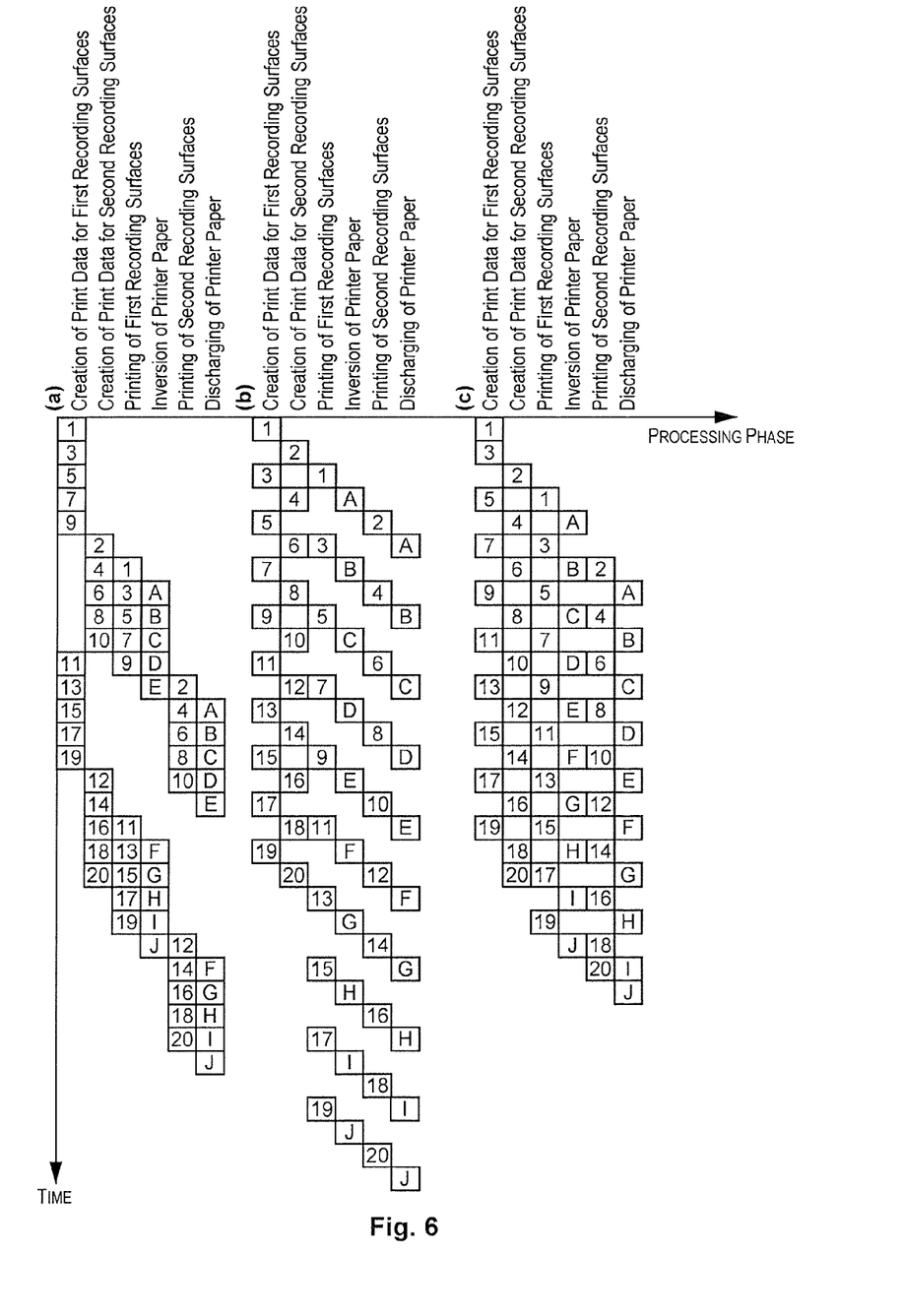
FIG. 6 shows relationships in the same format as FIG. 5 for conventional printing apparatuses.

FIG. 6 shows known printing methods for recording images on both sides of a printing medium using a conventional printing device (e.g., see Japanese Laid-Open Patent Application No. 2009-128376). FIG. 6 (a) shows a method in which printing is executed continuously with respect to a first recording surface of a plurality of printing media, after which the printing media are flipped over and printing is executed successively with respect to a second recording surface that corresponds to a back side of the first recording surface. FIG. 6 (b) shows a method in which both sides of each printing medium are printed in succession by printing on a first recording surface, flipping the printing medium over, and printing on a second recording surface and this process is repeatedly successively with respect to a plurality of printing media. FIG. 6 (c) shows a method that is a combination of the aforementioned two methods.

Regarding accomplishing two-sided printing with a printing device and focusing on a processing order of data to be printed, a method is known in which an efficiency of memory usage is optimized by storing the image data for a first recording surface and the image data for a second recording surface separately (e.g., see Japanese Laid-Open Patent Application No. 2009-226706).

Additionally, as a print data creating technology that focuses on document information size and memory capacity, a method is known which avoids interrupting a data processing operation by treating a back side as a blank page when an amount of memory required to store document information for the back side exceeds a storage capacity during processing of the back side (e.g., see Japanese Laid-Open Patent Application No. 63-293063).

SUMMARY

While a printing device performs two-sided printing, if a print process is started just after image data for a front side of a printing medium is generated, the print process may be interrupted when generation of image data cannot keep pace with the print process during printing of a back side of the printing medium. Therefore, the print process for the front side is started after generation of the image data for both of the front side and the back side is completed (e.g., see paragraph [0003] of Japanese Laid-Open Patent Application No. 2009-226706). In other words, when the printing device executes the two-sided printing, the device checks if print data exists on the front and back of the medium before it starts printing. With a method like that employed by the printing devices described in Japanese Laid-Open Patent Application No. 2009-128376 and Japanese Laid-Open Patent Application No. 2009-226706, when print data is created, creation of the print data for the second recording surface is not yet be completed at a stage when the print data for the first recording surface is completed in a case where a large print job is being processed and the creation of the print data takes place at the same speed or a faster speed than the actual printing. Consequently, the printing device must wait until the print data for the second recording surface has been created before it starts the two-sided printing, thus causing the start of printing to be delayed.

By adding the technology of Japanese Laid-Open Patent Application No. 63-293063 to Japanese Laid-Open Patent Application No. 2009-128376 and Japanese Laid-Open Patent Application No. 2009-226706, an incomplete page can be handled as a blank page in the same manner as when the memory size of the document information of a back side exceeds a storage capacity. In such a case, the first recording surface can be printed as soon as the print data is completed, but the second recording surface is not printed because it is replaced with blank page data.

As explained above, printing of a first recording surface can be delayed due to effects caused by a second recording surface and such delays can occur either before printing starts (i.e., the start of printing is delayed) or during printing.

The present invention was conceived in view of the situations described above and its object is to provide a printing device that can prevent unnecessary time loss during two-sided printing, i.e., during a period from when a creation of print data starts until printing starts, such that printing can be started quickly and printing can be started as soon as a set of print data for a first recording surface is completed regardless of a size of a set of print data for a second recording surface.

The present invention can be worked as any of the following aspects.

A printing device according to a first aspect is a printing device having a two-sided printing function and a circulatory transporting path configured to transport a printing medium. The printing device is configured such that after creating a set of print data for a first recording surface to be printed with two-sided printing, the printing device adds a set of dummy print data for a second recording surface corresponding to a back side of the first recording surface to the set of print data for the first recording surface.

In a printing device according to the first aspect explained above, the dummy print data preferably does not include a page break.

In a printing device according to the first aspect explained above, the dummy print data is preferably blank page data.

In a printing device according to the first aspect explained above, the dummy print data is preferably not added to a set of print data for the second recording surface.

A printing device control method according to a second aspect is a control method for a printing device having a two-sided printing function and a circulatory transporting path for transporting a printing medium. The control method includes creating a set of print data for a first recording surface to be printed with two-sided printing, and adding a set of dummy print data for a second recording surface corresponding to a back side of the first recording surface to the set of print data for the first recording surface.

A computer program product according to a third aspect is a computer program product for controlling a printing device having a circulatory transporting path configured to transport a printing medium and a two-sided print function. The computer program product is embodied in a non-transitory computer readable storage medium and includes computer instructions for: creating a set of print data for a first recording surface to be printed with two-sided printing; and adding a set of dummy print data for a second recording surface corresponding to a back side of the first recording surface to the set of print data for the first recording surface.

Other features of the present invention will be clarified in the description and appended drawings.

BRIEF DESCRIPTION OF THE DRAWINGS

Referring now to the attached drawings which form a part of this original disclosure.

DETAILED DESCRIPTION OF EXEMPLARY EMBODIMENTS

Embodiments of the present invention will now be explained in detail with reference to the drawings.

Figure 1:
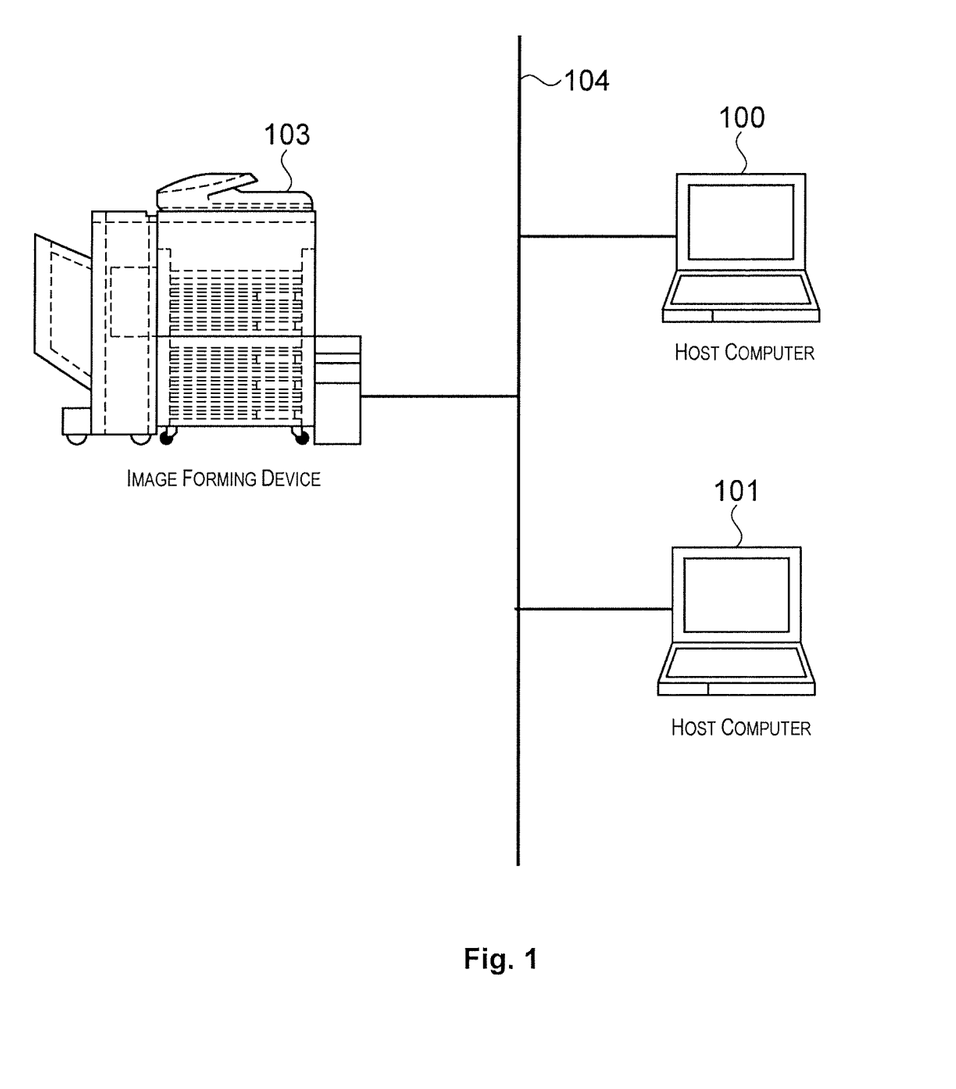
FIG. 1 shows an overall configuration of a printing system equipped with a printing device according to an embodiment of the present invention.

FIG. 1 shows an overall configuration of a printing system equipped with a printing device according to an embodiment of the present invention.

The printing system shown in FIG. 1 comprises host computers 100 and 101, an image forming device 103 comprising a printer, copier, or the like having a two-sided printing function, and a network 104 comprising a LAN (local area network) or other type of network.

The host computers 100 and 101 store word processing software and various other software applications and function as information processing devices serving to create print data through the word processing software and execute print settings and print instructions with respect to the image forming device 103. The host computers 100 and 101 can exchange data with the image forming device 103 through the network 104. It is acceptable for there to be a plurality of image processing devices 103 connected to the network 104. The network 104 can be any type of network so long as it enables data to be transferred between the image forming device 103 and the host computers 100 and 101.

FIG. 1 shows merely one example of some devices connected to a network 104. It should be clear that various other configurations can be conceived depending on the particular application or objective. That is, so long as a function of the present invention is employed, the invention can be applied to a standalone device, a system comprising a plurality of devices, or a system in which processing is executed through a network.

The hardware of the host computers 100 and 101 shown in FIG. 1 will now be explained with reference to FIG. 2. Only the hardware of the host computer 100 will be explained because both of the host computers 100 and 101 have the same hardware configuration.

Figure 2:
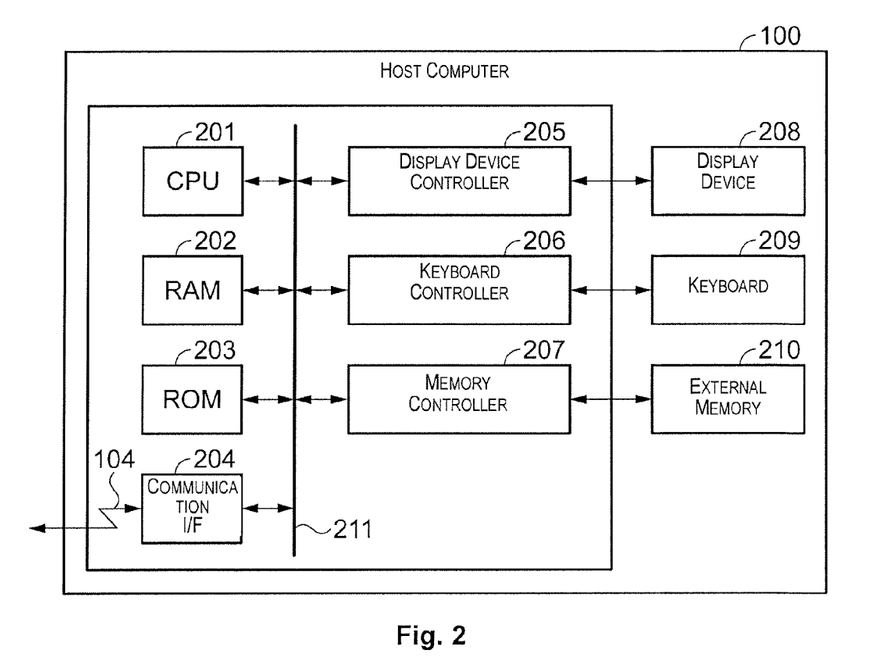
FIG. 2 is a block diagram showing a hardware configuration of a host computer.

FIG. 2 is a block diagram of the hardware components of the host computer 100 shown in FIG. 1.

As shown in FIG. 2, the host computer 100 has a CPU (central processing unit) 201 configured to access and execute general control of various devices connected to a system bus 211 based on a control program stored in a ROM 203 or an external memory 210.

A RAM (random access memory) 202 is connected to the system bus 211 and functions as a main memory and work area of the CPU 201. A BIOS (basic input/output system) program and an operating system program (hereinafter called "OS") serving as control programs of the CPU 201 as well as various other programs necessary for accomplishing processing executed by the image forming device and the host computer 100 are stored in the ROM 203 or the external memory 210.

The CPU 201 loads programs necessary for executing control processing to the RAM 202 and carries out various operations by executing the programs. These programs include word processing and other programs and data for drawings, images, fonts, tables, etc., that are stored in the ROM 203 or an external memory 210.

The keyboard controller 206 serves to control input from a keyboard 209 and a pointing device (not shown). The display device controller 205 serves to control the display function of a display device 208, which is a CRT display, a liquid crystal display, or the like. A memory controller 207 serves to control access to the external memory.

The external memory 210 is a hard disk (HD) or other memory device and serves to store various programs mentioned previously, which include a boot program, various applications, font data, user files, and edit files. A communication I/F (communication interface) 204 is connected to the image forming device 103 shown in FIG. 3 through the network 104 and serves to enable two-way communication.

The CPU 201 enables WYSIWYG on the display device 208 by, for example, executing a development processing (rasterization) serving to develop outline fonts in a display information area inside the RAM 202. The CPU 201 also opens various registered windows and executes various data processing operations based on commands designated using a mouse cursor (not shown) on the display device 208.

The hardware of the image forming device 103 shown in FIG. 1 will now be explained with reference to FIG. 3.

Figure 3:
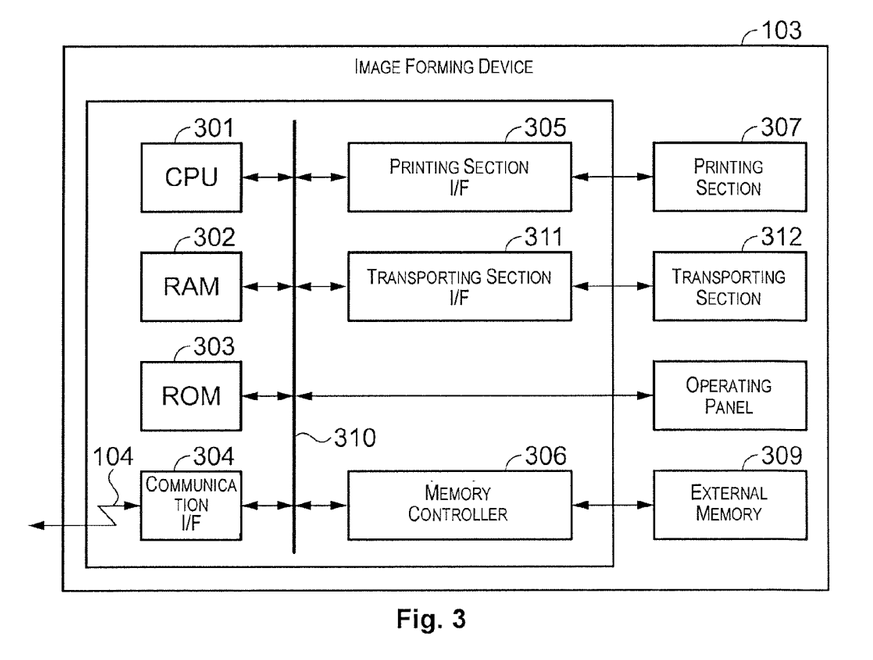
FIG. 3 is a block diagram showing a hardware configuration of a host computer.

FIG. 3 is a block diagram of the hardware components of the image forming device 103 shown in FIG. 1.

In FIG. 3, the image forming device 103 has a CPU 301 configured to access and execute general control of various devices connected to a system bus 310 based on a control program stored in a ROM 303 or an external memory 309. The CPU 301 instructs a transporting section 312 to transport a printing medium by communicating through a transporting section I/F (transporting section interface) 311 and sends image signals as output data to a printing section (printer engine) 307 through a printing section I/F (printing section interface) 305.

The RAM 302 functions as a main memory and work area of the CPU 301. The RAM 302 is contrived such that its memory capacity can be expanded with an optional RAM (not shown) connected to an auxiliary port (not shown). The RAM 302 is used as an output development area and an environment data storage area.

The external memory 309 comprises a hard disk, an IC card, or other memory device (or storage medium) that is connected optionally and can be accessed/controlled by the memory controller 306. The external memory 309 stores such things as form data, emulation programs, and font data. The number of external memories 309 is not limited to one and it is also acceptable to connect a plurality of external memories, e.g., an optional font card for extra fonts in addition to internally stored fonts and an external memory storing programs for translating different printer control languages.

A communication I/F (communication interface) 304 is connected to the host computer 100 shown in FIG. 2 through the network 104 and serves to enable two-way communication.

Figure 4:
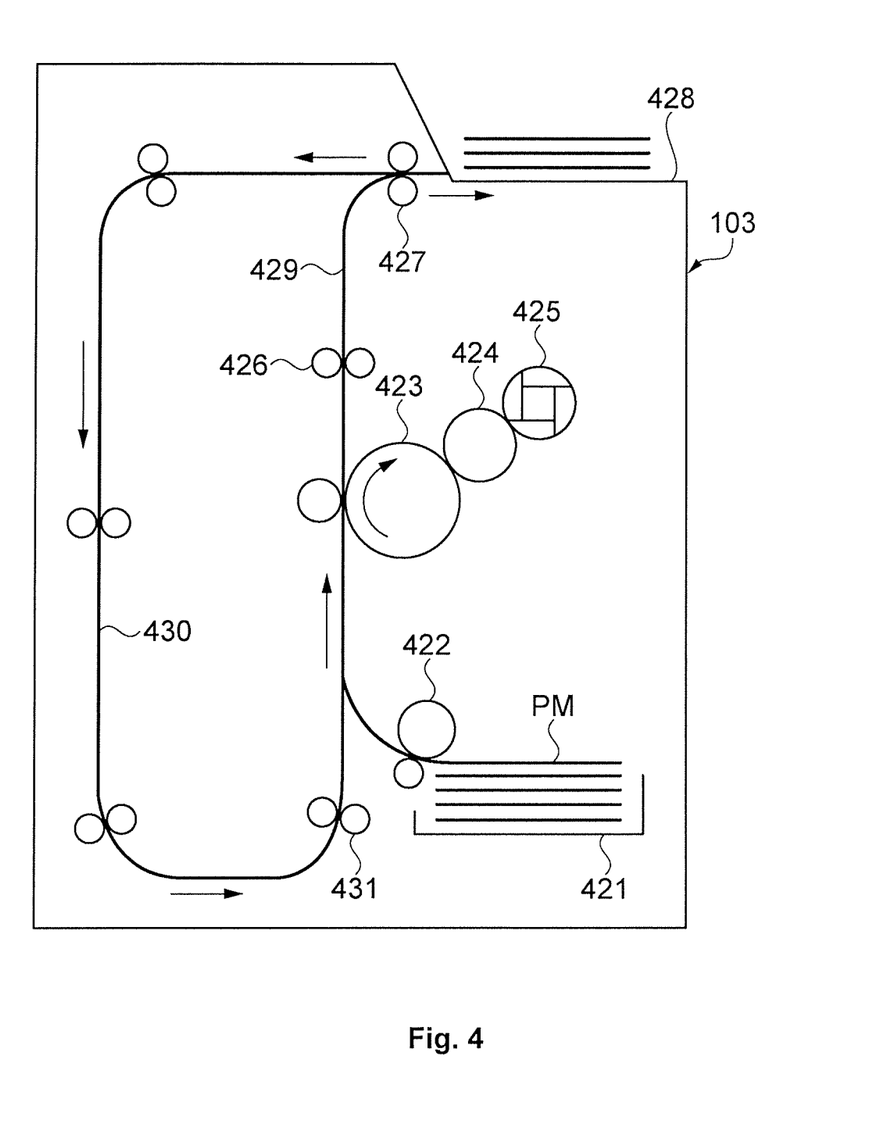
FIG. 4 is a schematic view showing a structure of a printing section and a transporting section of an image forming device.

FIG. 4 is schematic view showing a structure of a printing section 307 and the transporting section 312 of the image forming device 103 shown in FIG. 3.

The printing section 307 comprises a transfer drum 423, a photosensitive drum 424, an image developing device 425, and a fixing device 426. The transporting section 312 comprises a paper feeding roller 422, a paper discharging roller 427, a normal path 429, an inverting path 430, and a re-feeding roller 431.

A print recording medium PM is stored in a paper feed tray 421 such that it can be extracted from the paper feed tray 421 by the paper feeding roller 422. The extracted print recording medium PM is transported by a transporting belt toward the transfer drum 423.

A latent image is formed on a surface of the photosensitive drum 424 by a laser unit (not shown). The latent image is developed into a visible image by the image developing device 425. The visible image is transferred to the transfer drum 423 and printed onto a surface of one side of the print recording medium PM by the transfer drum 423. After the image is transferred from the transfer drum 423, the print recording medium PM is transported toward the fixing device 426. The fixing device 426 fixes the image to the surface of the print recording medium PM by heating and fusing the toner or other coloring agent adhered to the surface. The print recording medium PM is then discharged to a discharge tray 428 by the discharging roller 427. The path spanning from the paper feed tray 421 to the transfer drum 423, the fixing device 426, and the discharging roller 427 corresponds to the aforementioned normal path 429.

Meanwhile, during two-sided printing or when a paper discharge direction is changed, a print recording medium PM that has already completed printing on one side is transported to the re-feeding roller 431 by inverting path 430. The re-feeding roller 431 feeds the print recording medium PM toward the transfer drum 423 again. This time, the print recording medium is flipped over such that unprinted side is upward. When the print recording medium PM is transported only through the normal path 429, it is discharged face down as shown in an upper portion of FIG. 4. Meanwhile, if the print recording medium PM is transported through the inverting path 430, then it is discharged face up.

The circulatory transporting path comprises the normal path 429 and the inverting path 430.

Figure 5:
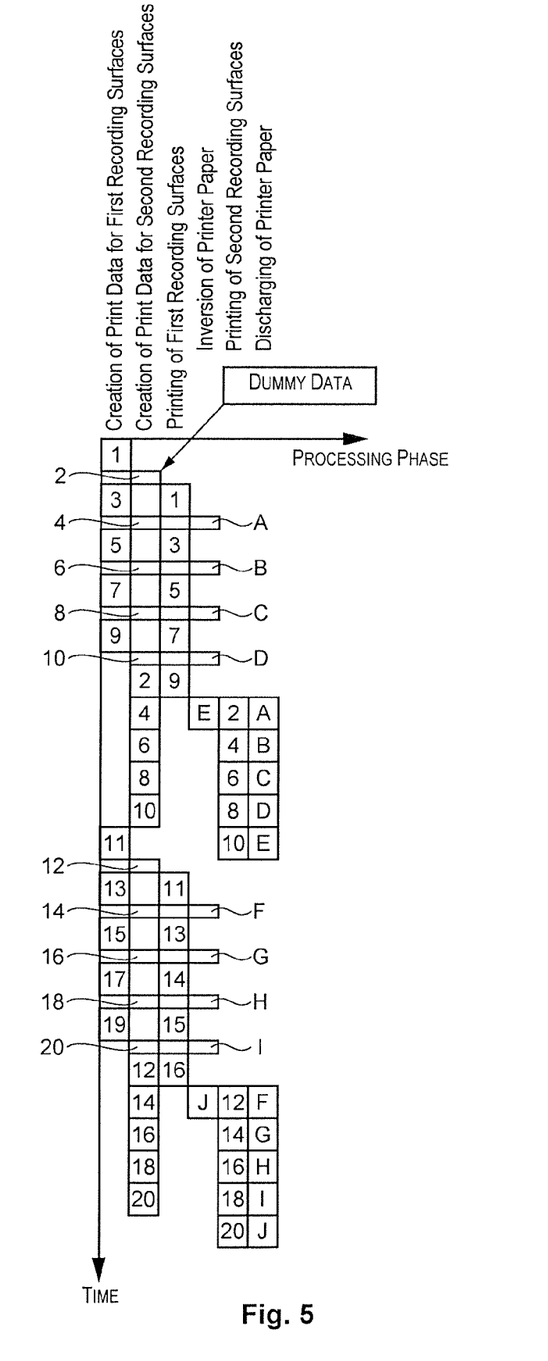
FIG. 5 shows a time axis illustrating timing relationships among print data creation processing executed by a CPU, print processing executed by a printing section, and transport processing executed by a transporting section during two-sided printing on printer paper.

FIG. 5 shows a time axis illustrating timing relationships among print data creation processing executed by the CPU 201 of the host computer 100, print processing executed by the printing section 307, and transport processing executed by the transporting section 312 during two-sided printing of pages 1 to 20 of twenty pages of data onto ten sheets of printer paper A to J. FIG. 6 shows relationships in the same format as FIG. 5 for conventional printing apparatuses.

The CPU 201 calculates a number of sheets of printer paper that can be processed in the circulatory transporting path and executes a print data creation processing based on the calculated number. When it creates a set of print data for a first recording surface, the CPU 201 adds a set of dummy print data for a second recording surface corresponding to a back side of the first recording surface. The dummy data and a method of calculating a number of sheets of printer paper that can be processed in the circulatory transporting path will now be explained with reference to FIG. 7. The created data is sent to the image forming device 103 with a burst transmission through the network 104.

Based on the data received, the image forming device 103 executes print processing by operating the printing section 307. Before executing the print processing of the first recording surface, the image forming device 103 determines if there is print data for the second recording surface. During performing the two-sided printing. starting the print process just after the print data for the first recording surface is generated may cause interruption of the print process if generation of the print data cannot keep pace with the print process during printing of the second recording surface. Therefore, the image forming device 103 starts the print process for the first recording surface after checking that the generation of the image data for both of the first and second recording surfaces is completed.

The transporting section 312 determines if the print data of a printing medium that has been printed by the printing section 307 is on the first recording surface. If the print data is on the first recording surface, then the transporting section 312 sends the print recording medium to the inverting path.

As explained previously, by adding dummy data for the second recording surface corresponding to the first recording surface, printing of the first recording surface can be started without waiting for the print data of the second recording surface to be created.

Also, since the CPU 201 calculates a number of sheets of printer paper that can be processed in the circulatory transporting path, creates the print data based on the calculated number, and sends the print data to the image forming device 103 with a burst transmission, the image forming device 103 can execute print processing without taking into account a processing order of the received data.

Figure 7:
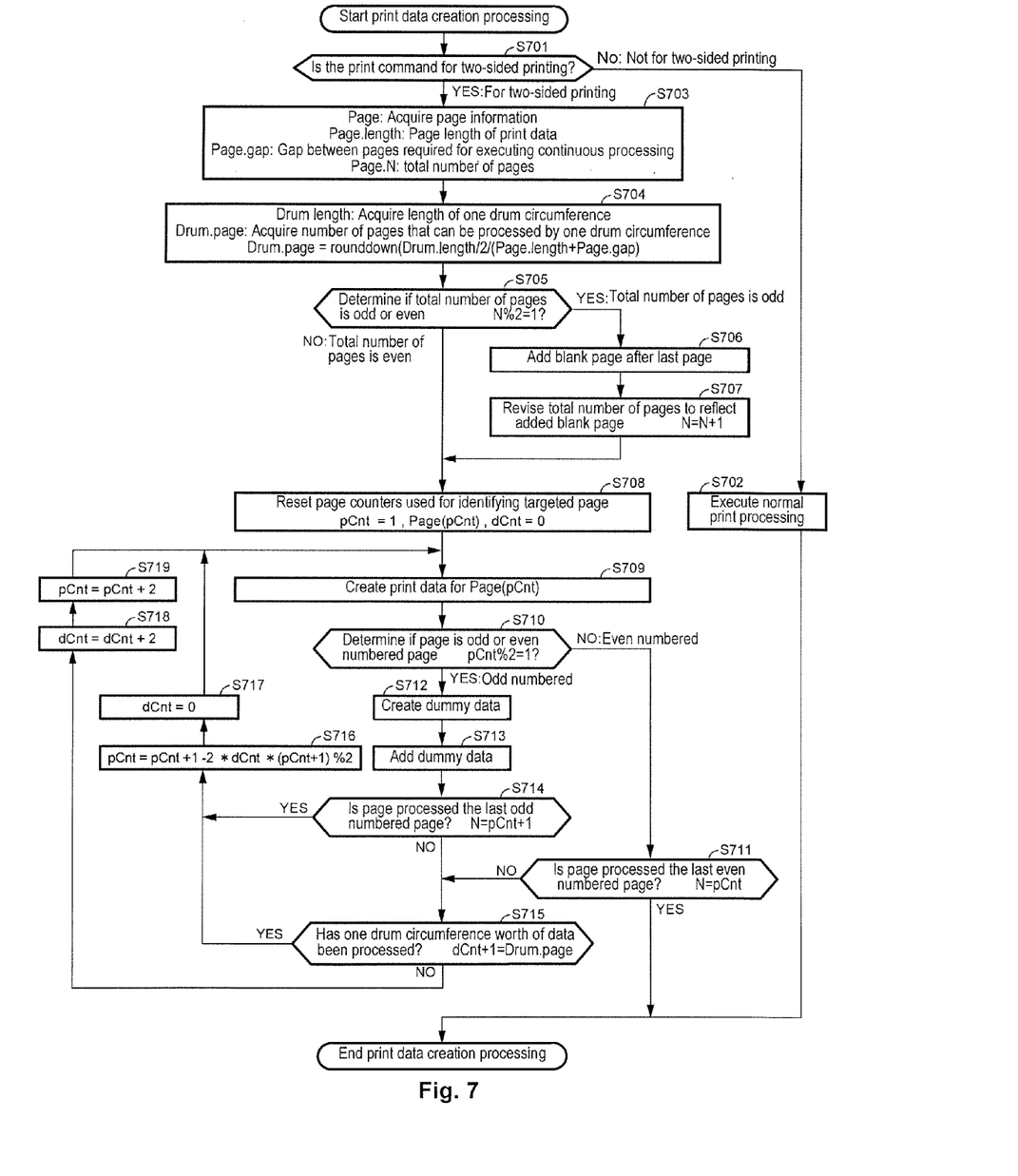
FIG. 7 is a flowchart of a print data creation routine executed by a CPU of a host computer.

FIG. 7 is a flowchart of a print data creation routine executed by the CPU 201 of the host computer 100 shown in FIG. 1.

In step S701 of FIG. 7, the CPU 201 receives a print command from the operating system and determines if the print command is set to execute two-sided printing. If the print command does not require two-sided printing, then the CPU 201 executes a normal print processing (step S702) and ends the routine. Conversely, if the print command requires two-sided printing, then the CPU 201 proceeds to step S703.

In step S703, the CPU 201 reads page information from the ROM 203, the external memory 210, or another storage device. The page information includes information regarding such paper-related things as a page length (Page.length) of the printer paper, a gap between pages (Page.gap) required when printing continuously, and a total number of pages (Page.N).

In step S704, the CPU 201 acquires drum information related to the transfer drum 423 to be used during printing. The drum information includes a circumference length (Drum.length) of the transfer drum 423 and a number of pages (Drum.page) that can be processed with one circumference of the transfer drum 423. The number of pages (Drum.page) that can be processed with one circumference of the transfer drum 423 is determined based on the circumference length (Drum.length) and page information regarding the printer paper to be used.

In step S705, the CPU 201 determines if an acquired total number of pages (Page.N) is an odd number or an even number. If it determines that the total number of pages is an odd number, the CPU 201 adds a blank page (S706) to an end of the data to be printed and adds 1 to the total number of pages (S707) in accordance with the added page. The CPU 201 then proceeds to step S708. If it determines that the total number of pages is even, then the CPU 201 proceeds to step S708.

In step S708, the CPU 201 initializes such counters as a page counter (pCnt) for specifying a targeted page in order to determine a page targeted for processing and a drum counter (dCnt) indicating how many sheets worth of data has been created during a process of creating print data corresponding to one drum circumference. The CPU 201 then proceeds to step S709.

In step S709, the CPU 201 executes processing to create print data for a page (Page(pCnt)) specified by the page counter (pCnt) and proceeds to step S710.

In step S710, the CPU 201 determines if the page specified by the page counter (pCnt) is an odd page or an even page. If it determines that the page is even, then the CPU 201 proceeds to step S711. If it determines that the page is odd, then the CPU 201 proceeds to step S712. In this embodiment, print data for odd pages corresponds to data for printing on a first recording surface and print data for even pages corresponds to data for printing on a second recording surface.

In step S711, the CPU 201 determines if the value of the page counter (pCnt) equals the total number of pages (Page.N) and the last page has been processed. If it determines that the values are equal and the last page has been processed, the CPU 201 ends the routine. If it determines that the last page has not been processed, the CPU 201 proceeds to step S715.

In step S712, the CPU 201 creates dummy data. In step S713, the CPU 201 adds the dummy data it created to an end of the print data. The dummy data the CPU 201 creates will be explained later.

In step S714, the CPU 201 determines if the page specified by the page counter (pCnt) and processed is a last odd numbered page. If it determines that the page is the last odd numbered page, the CPU 201 proceeds to step S716. Otherwise, the CPU 201 proceeds to step S715.

In step S715, the CPU 201 determines if an amount of print data corresponding to one drum circumference has been created. If it determines that one drum circumference worth of print data has been created, the CPU 201 proceeds to step S716. Otherwise, the CPU 201 executes the processing of step S718.

In step S716, the CPU 201 updates the page counter (pCnt) in order to determine a next page to be processed. More specifically, the CPU 201 adds 1 to a current value of the page counter (pCnt). Furthermore, if the value of the page counter (pCnt) is even before adding 1, then the CPU 201 subtracts a value equal to twice the value of the drum counter (dCnt) from the value of the page counter after adding 1 to determine a new value of the page counter. The CPU 201 then proceeds to step S717.

In step S717, the CPU 201 resets the drum counter (dCnt) to and proceeds to step S709.

Meanwhile, if it determines in step S715 that one drum circumference worth of print data has not been created, then the CPU 201 adds 1 to the drum counter (S718) and adds 2 to the page counter (S719) before proceeding to step S709.

With the print data creation scheme described above, dummy data is not added to all pages but, instead, is efficiently added only to pages where it is necessary. As a result, a delay of the start of printing can be avoided, thus solving a problem the present invention is intended to solve. Additionally, this scheme also address the problem of printing being interrupted (stopped) due to an amount of print data of the second recording surfaces being larger than an amount of print data of the first recording surfaces and requiring a large amount of time to create.

The dummy data can have any form so long as it is recognized as a page and does not contain a page break command or the like that will cause a discharge operation to be performed. So long as the data does not include a plotting command, toner or another coloring agent will not be deposited onto the printer paper and the dummy data will have no effect with respect to the actual printing result. Additionally, in addition to being recognized as a page, blank page data is small in terms of data size and does not require much time to create or transmit. Therefore, it can be said that blank page data is the best dummy data in view of the object of the invention.

Variation 1

Although in the previously explained embodiment the CPU 201 of the host computer 100 creates the print data, it is acceptable if data in a form that has not yet been put into a print data format is sent from the host computer to the image forming device 103 and the CPU 301 of the image forming device 103 creates the print data.

When the print data is created by the CPU 301 of the image forming device 103, the transmission distance and transmission time required after the print data is created are shortened and time losses incurred due to conditions of the host computer when print data is created can be reduced in comparison with an arrangement in which the print data is created at the host computer.

Variation 2

Although in the embodiment the host computer 100 and the image forming device 103 are connected together through a network 104, it is acceptable if th image forming device 103 includes a host computer 100 and a common CPU and a common RAM are shared instead of having the separate CPUs 201 and 301 and the separate RAMs 202 and 302.

Variation 3

Although the dummy data created in the previously explained embodiment does not include a plotting command, it is also acceptable to use print data of a background image—such as a woven pattern or a stamp mark—as the dummy data. By using print data for a background image as the dummy data, a background image can be printed on only a specified side of the printer paper.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printing device having a circulatory transporting path configured to transport a printing medium and a two-sided print function in which print data for both two sides of the printing medium are to be created before a printing process of the printing medium starts, the printing device comprising:
a print data creating unit configured to create a first print data for a first recording surface of a first printing medium to be printed with two-sided printing,
add a first dummy print data for a second recording surface of the first printing medium to the first print data for the first recording surface, the second recording surface corresponding to a back side of the first recording surface,
create a second print data for the second recording surface after adding the first dummy print data for the second recording surface to the first print data for the first recording surface.

2. The printing device recited in claim 1, wherein the first dummy print data does not include a page break.

3. The printing device recited in claim 1, wherein the first dummy print data is blank page data.

4. The printing device recited in claim 1, wherein a dummy print data is not added to the second print data for the second recording surface.

5. The printing device according to claim 1, wherein the print data creating unit is further configured to create a third print data for a third recording surface of a second printing medium to be printed with the two-sided printing, add a second dummy print data for a fourth recording surface of the second printing medium to the third print data for the third recording surface, and create a fourth print data for the fourth recording surface after adding the second dummy print data for the fourth recording surface to the third print data for the third recording surface, the second printing medium is transported next to the first printing medium, and the fourth recording surface corresponds to a back side of the third recording surface.

6. A control method for a printing device having a circulatory transporting path configured to transport a printing medium and a two-sided print function in which print data for both two sides of the printing medium are to be created before a printing process of the printing medium starts, the control method comprising:
creating a first print data for a first recording surface of a first printing medium to be printed with two-sided printing;
adding a dummy print data for a second recording surface of the first printing medium to the first print data for the first recording surface, the second recording surface corresponding to a back side of the first recording surface;
creating a second print data for the second recording surface after adding the dummy print data for the second recording surface to the first print data for the first recording surface.

7. A non-transitory computer-readable medium storing computer program for controlling a printing device having a circulatory transporting path configured to transport a printing medium and a two-sided print function in which print data for both two sides of the printing medium are to be created before a printing process of the printing medium starts, the non-transitory computer-readable medium causing a computer to function as:
creating a first print data for a first recording surface of a first printing medium to be printed with two-sided printing;
adding a dummy print data for a second recording surface of the first printing medium to the first print data for the first recording surface, the second recording surface corresponding to a back side of the first recording surface;
creating a second print data for the second recording surface after adding the dummy print data for the second recording surface to the first print data for the first recording surface.

* * * * *